(12) United States Patent
Selle et al.

(10) Patent No.: US 7,681,938 B2
(45) Date of Patent: Mar. 23, 2010

(54) CONVERTIBLE VEHICLE

(75) Inventors: Heinrich Selle, Bad Oeynhausen (DE); Hermann Heidtmann, Haseltunne (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 11/661,435

(22) PCT Filed: Sep. 1, 2005

(86) PCT No.: PCT/DE2005/001539
§ 371 (c)(1),
(2), (4) Date: Dec. 27, 2007

(87) PCT Pub. No.: WO2006/024290
PCT Pub. Date: Mar. 9, 2006

(65) Prior Publication Data
US 2008/0093881 A1 Apr. 24, 2008

(30) Foreign Application Priority Data
Sep. 1, 2004 (DE) .......................... 10 2004 042 261

(51) Int. Cl.
*B60J 7/185* (2006.01)
*B60J 7/19* (2006.01)
(52) U.S. Cl. ............ 296/121; 292/DIG. 5; 296/107.08; 296/136.06
(58) Field of Classification Search ............ 296/76, 296/121, 107.08, 124, 128, 129, 136.06; 292/DIG. 5
See application file for complete search history.

(56) References Cited

U.S. PATENT DOCUMENTS

| | | | |
|---|---|---|---|
| 5,269,586 A | 12/1993 | Hahn et al. | |
| 5,624,149 A * | 4/1997 | Tokarz | 296/121 |
| 6,168,224 B1 | 1/2001 | Henn et al. | |
| 6,746,073 B2 | 6/2004 | Heller et al. | |
| 7,128,361 B2 * | 10/2006 | Guillez et al. | 296/107.08 |
| 2001/0005090 A1 * | 6/2001 | Haberl et al. | 296/121 |
| 2003/0141741 A1 * | 7/2003 | Obendiek | 296/121 |
| 2003/0146643 A1 * | 8/2003 | Dietl | 296/121 |
| 2004/0155480 A1 * | 8/2004 | Willard | 296/107.08 |
| 2005/0285428 A1 * | 12/2005 | Dilluvio | 296/107.08 |
| 2008/0122248 A1 * | 5/2008 | Neubrand | 296/121 |
| 2008/0122249 A1 * | 5/2008 | Habacker | 296/121 |

* cited by examiner

*Primary Examiner*—Jason S Morrow
(74) *Attorney, Agent, or Firm*—Gifford, Krass, Sprinkle, Anderson & Citkowski, P.C.

(57) ABSTRACT

The invention relates to a cabriolet vehicle having a roof that can be stored underneath a cover part in an open position, at least two displaceable engagement organs and an associated drive being provided to secure a closed cover part. The drive interacts with the engagement organs to transmit a driving force through a force transmission element having a component that extends in the transverse direction of the vehicle. A driven organ can lie in a transverse direction of the vehicle and generally on the same plane as the force transmission elements. In addition, a gear mechanism can be displaced by a rectilinear coupling organ that is connected to the force transmission element and runs parallel to the drive organ.

8 Claims, 6 Drawing Sheets

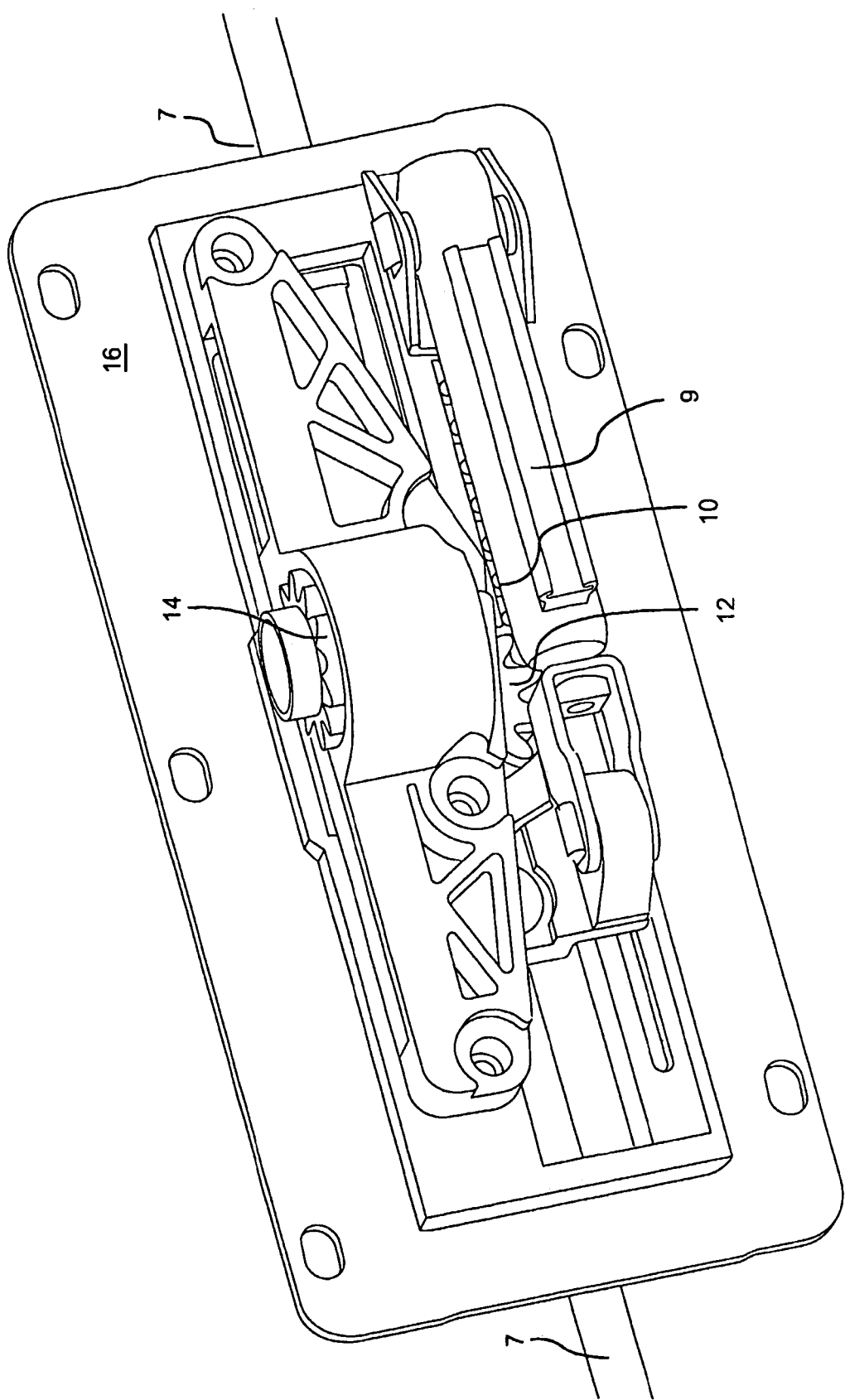

CONVERTIBLE VEHICLE

REFERENCE TO RELATED APPLICATIONS

This application is the United States national phase of Patent Cooperation Treaty application No. PCT/DE05/001539, filed Sep. 1, 2005, which claims priority to German patent application No. DE 10 2004 042 261.3-24, filed Sep. 1, 2004, the entire content of both of which is incorporated herein by reference.

FIELD OF THE INVENTION

The invention relates to a convertible vehicle comprising a roof stowable beneath a cover part closure control.

BACKGROUND OF THE INVENTION

A number of convertible vehicles are known in which a movable roof can be stowed in a roof receiving space beneath a cover part in an open position. For this purpose, the cover part is frequently pivoted to the car body in its rear region and has to be held at the car body for securing in its substantially horizontal closed position above the closed roof. Two engagement members, for instance rotary latches, arresting hooks or the like, disposed laterally outwardly can serve for this purpose which are to be actuated via a closure control held at an intermediate wall bounding the roof receiving space to the front. The engagement members can be connected to a central motor drive of the closure control via force communicators, for instance chains, cable controls or in particular pull and/or push bars, extended substantially transversely to the vehicle.

The drive conventionally requires substantial space and thus projects into the trunk or roof stowing space, whereby this is reduced in size. In addition, a high construction effort results for conventional closure controls.

It is the underlying problem of the invention to achieve a reduction in the space requirements and a simplification of the closure control.

SUMMARY OF THE INVENTION

According to one aspect of the invention, a convertible vehicle includes a roof which can be stowed beneath a cover part in an open position. The vehicle also includes at least two movable engagement members for securing cover part in a closed position and at least one drive in operative connection with the engagement members for the transmission of a drive force via force communicators each outwardly engaging with a component in the transverse direction of the vehicle. The drive includes a drive member disposed generally in the transverse direction of the vehicle and in the plane of the force communicators. A transmission redirecting the direction of movement for a second force communicator being movable via a coupling member movable in a straight line and parallel to said drive member and connected to a first force communicator. The first force communicator is fixedly connected to the drive member, i.e. without the use of the transmission, the drive member providing direct drive of the first communicator.

By this arrangement, a closure control of substantially reduced size can be provided. Since the drive includes a drive member disposed at least approximately in the transverse direction of the vehicle and in the plane of the force communicator, its projection into the trunk or roof stowage space is prevented. Since a transmission deflecting the direction of movement for a second force communicator can be moved via a coupling member movable in a straight line and parallel to the drive member and connected to a first force communicator, this transmission can also have an extent substantially parallel to the intermediate wall without far-projecting parts. In addition, the design is simplified due to the direct link of a first force communicator to the coupling member movable in a straight line.

According to another aspect of the invention, the drive includes at least one transmission element movable in a straight line and connected to the force communicator. The drive is provided with a first coupling arrangement for the indirect or direct engagement of the drive and with a second coupling arrangement for the engagement of a manual actuation.

If a plurality of coupling arrangements to a single transmission element are implemented for this purpose, the design is further simplified. Provided that at least one of the coupling arrangements is formed by a gear rack portion, a reliable force transmission can be achieved between parts moved in a linear straight line fashion and rotating parts.

A good accessibility for an emergency actuation is in particular achieved when the coupling arrangements are perpendicular to one another.

A reliable and space saving force transmission from the drive member results in a particularly advantageous manner when, for this purpose, a transmission member is arranged parallel to a piston of a drive member which can be pushed out and a gear is rotatable via the transmission element and a second transmission member movable in a straight line can be driven by it.

BRIEF DESCRIPTION OF THE DRAWINGS

Further advantages and features of the invention result from embodiments of the subject matter of the invention shown schematically in the drawings and described in the following descriptions.

FIG. 6 is a similar view to FIG. 5 with parts arranged partly swapped over with respect to the vertical position.

DETAILED DESCRIPTION OF THE INVENTION

Referring to the figures, a convertible vehicle according to the invention is generally indicated at 1. The vehicle 1 includes a roof that is movable between a closed position extending over a passenger compartment and a stowed position disposed in a receiving space 3 located behind the passenger compartment.

The receiving space 3 is bounded at the front side with respect to a direction of travel "F" by an intermediate wall 2. optionally, the intermediate wall 2 may be provided with a recess 2a as a pass-through.

Figure 1:
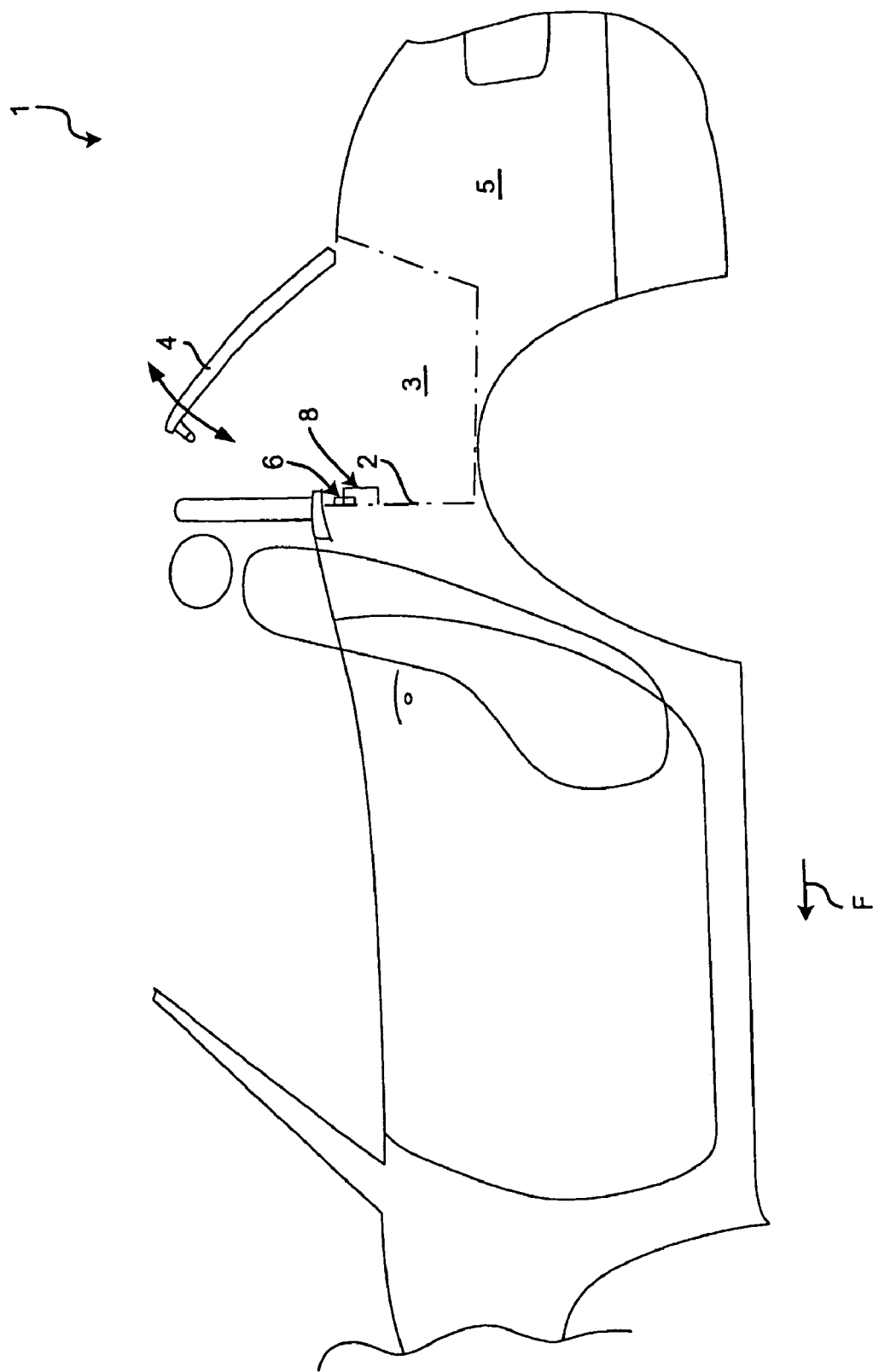
FIG. 1 is a schematic side view of a convertible vehicle in accordance with the invention broken off in the front region with a cover part opened above a roof receiving space.
Figure 2:
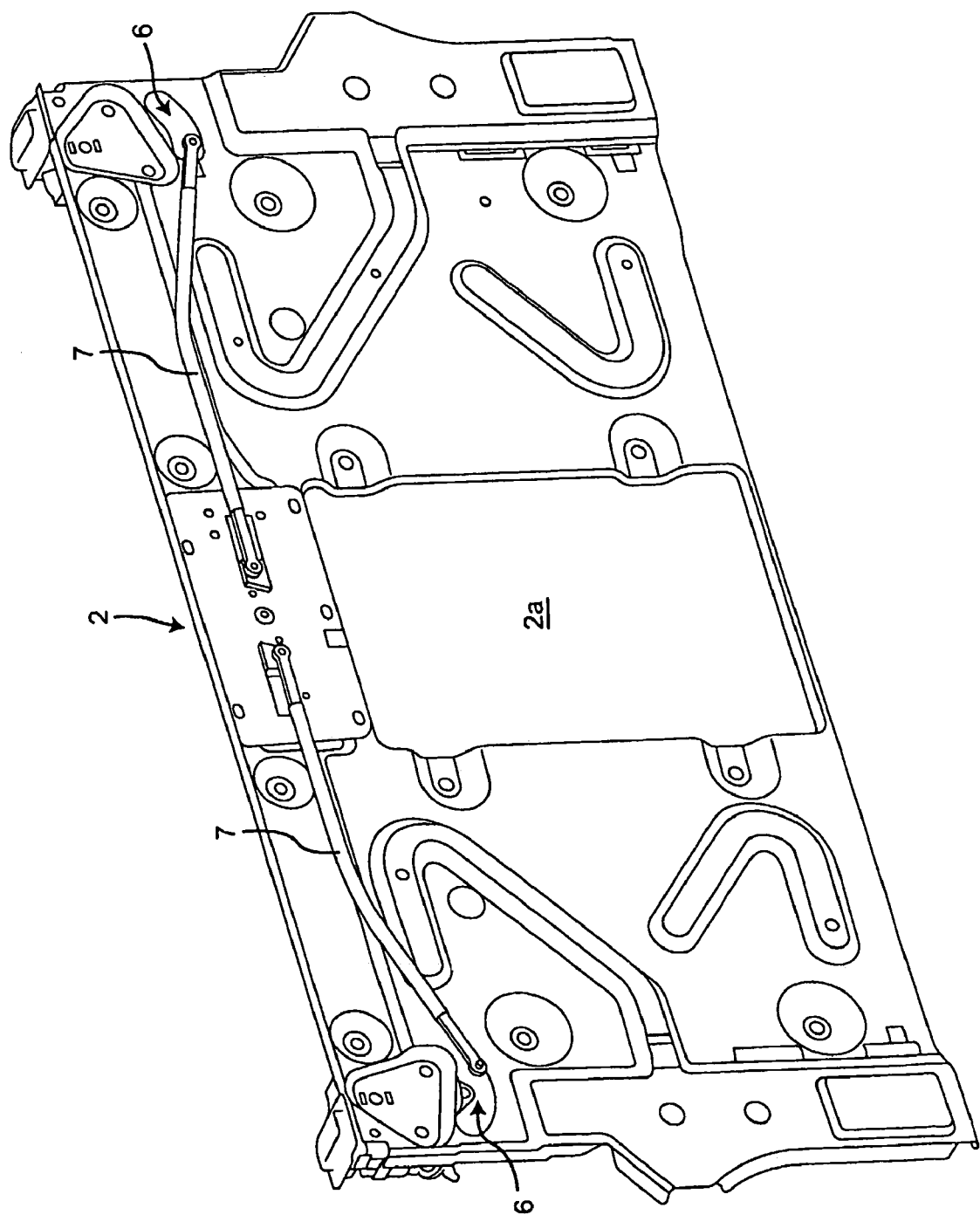
FIG. 2 is the intermediate wall bounding the roof receiving space to the front in a view from the front.
Figure 3:
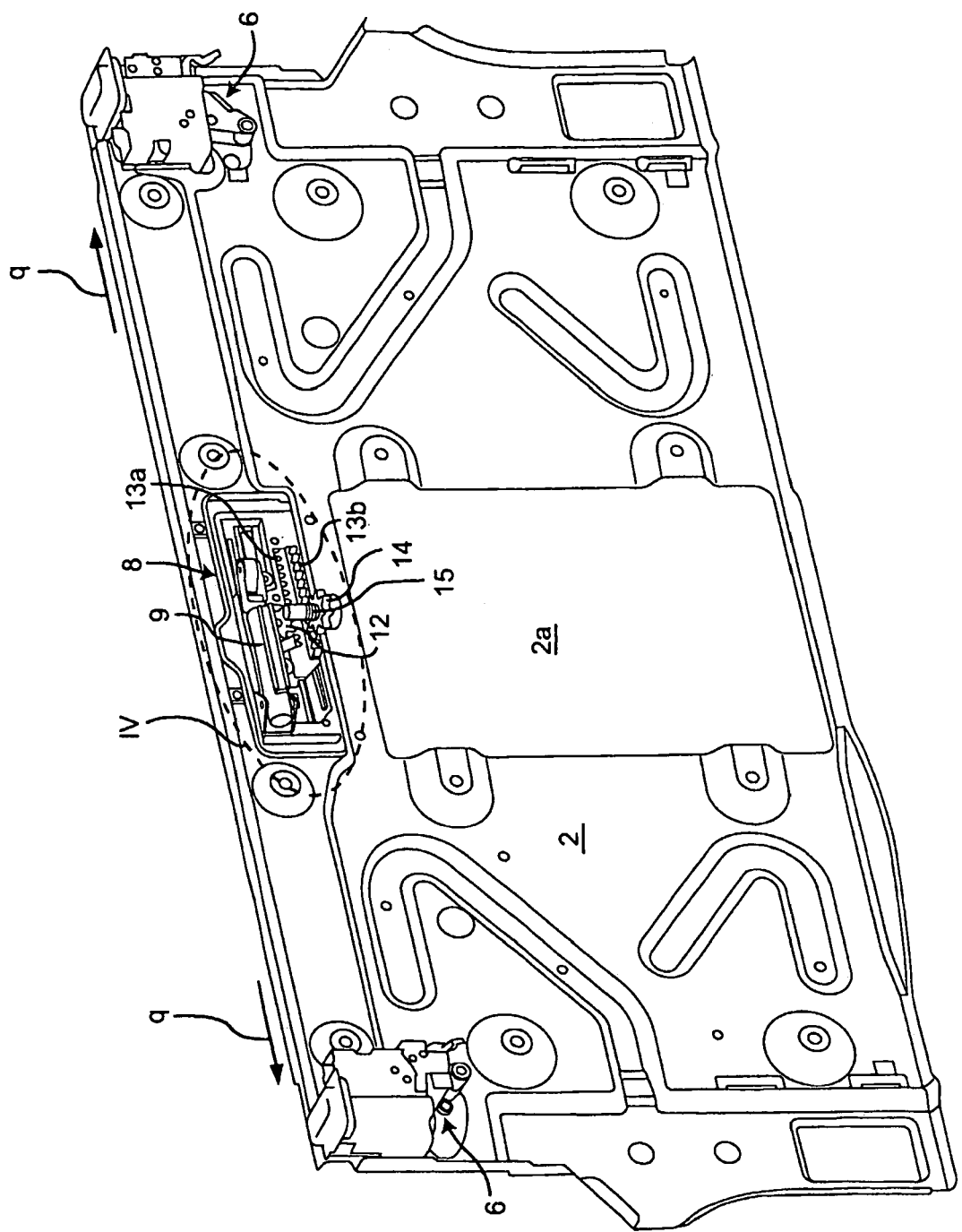
FIG. 3 is the intermediate wall in accordance with FIG. 2 in a view from the rear.

At the top, the receiving space 3 can be closed at least partly by a cover part 4. This is shown in a half open position in FIG. 1. The cover part 4 is pivotably hinged at its rear region to the car body 5, but may also be able to be opened and closed in a translatory manner or in a superimposed movement. It is also possible for the cover part 4 to be enlarged with respect to the drawing and, in a dual function, also to represent a trunk flap which can be opened in two pivot movements in opposite senses to one another.

In every case, the cover part 4 is latched to the car body 5 in its closed position (not shown).

In the illustrated embodiments, two engagement members outwardly disposed outwardly laterally in the transverse direction q of the vehicle serve this purpose, are made in approximately hook shape and are pivotable around axes disposed in dependence on construction circumstances. They can, however, be made in the most varied manner and also carry out translatory or superimposed rotation and translation movements for the locking and unlocking. Their number is also variable. A central engagement member can thus, for example, also be provided.

The engagement members 6 are movable via laterally outwardly engaging force communicators 7 starting from a closure module 8 which is central here. They are made as pull-push bars in accordance with the invention. Chains, cable controls, toothed belts or similar can also be considered. A top dead centre position is frequently adopted in the closed position of the engagement members 6. Such a position can then be dispensed with on the movement of the pull-push bars 7. They can rather be moved simply in a straight line between the closed position and the open position. A drive for the engagement members 6 acting as locks is associated with the closure module 8, which can also lie off-center, and can include a hydraulic 9 or an electric drive member, for example.

A hydraulic drive member 9 is shown in the drawing. It can be pre-assembled on the closure module 8 and lies at least approximately parallel to the transverse direction q of the vehicle and approximately in the plane of the pull-push bars 7, thus substantially horizontally and very close to the intermediate wall 2, without projecting far into the receiving space 3, which can also be co-used as trunk with a closed roof.

A coupling member 10 is arranged parallel to the drive member 9 and is connected to its piston which can be pushed out. It is here made as a gear rack and is movable in a straight line and parallel to the piston. A first force communicator 7 is held at the coupling member 10 and thus directly movable by it. Sliding guides can be provided for the straight line direction of the movement.

In addition to the direct drive of the at least substantially translatory movement of this pull-push bar 7, the coupling member 10 also engages at a transmission 11 redirecting the direction of movement for a second pull-push bar 7. The transmission 11 for this purpose includes a rotatable gear 12 which is substantially disposed in the transverse direction of the vehicle and which transmits the drive force to a second transmission element 13 which is likewise movable in a straight line and which is thereby movable anti-parallel to the first. The second transmission element 13 is connected via a second pull-push bar 7 to an oppositely disposed engagement member 6. Since the drive 9 does not lie on the axis of the gear 12, the extent of the arrangement is substantially reduced in the longitudinal direction of the vehicle. In addition, it is appreciated that the figures teach that the first communicator 7 can be fixedly connected to the drive member 9, i.e. without the use of the transmission 11, and the drive member 9 can directly drive the first communicator 7.

By moving the piston in and out, both the coupling member 10 acting as the first transmission element of the drive force and the second transmission element 13 are thus moved simultaneously in opposite senses to one another and the corresponding pull-push bars 7 are moved therewith.

In order also to permit an emergency actuation on the failure of the drive member 9, the transmission 11 is manually movable.

For this purpose, either the coupling member 10 serving as the first transmission element or, as illustrated, the second transmission element 13 is not only provided with a coupling arrangement 13a for the engagement of the drive 9 via the gear 12, but also with a second coupling arrangement 13b for the engagement of a manual emergency actuation 14.

Both coupling arrangements 13a, 13b are made as gear rack portions and are perpendicular to one another at a 90° angle.

The hydraulic drive 9 can be depressurized so that the coupling member 10 can also remain in engagement with the piston during manual operation.

Figure 4:
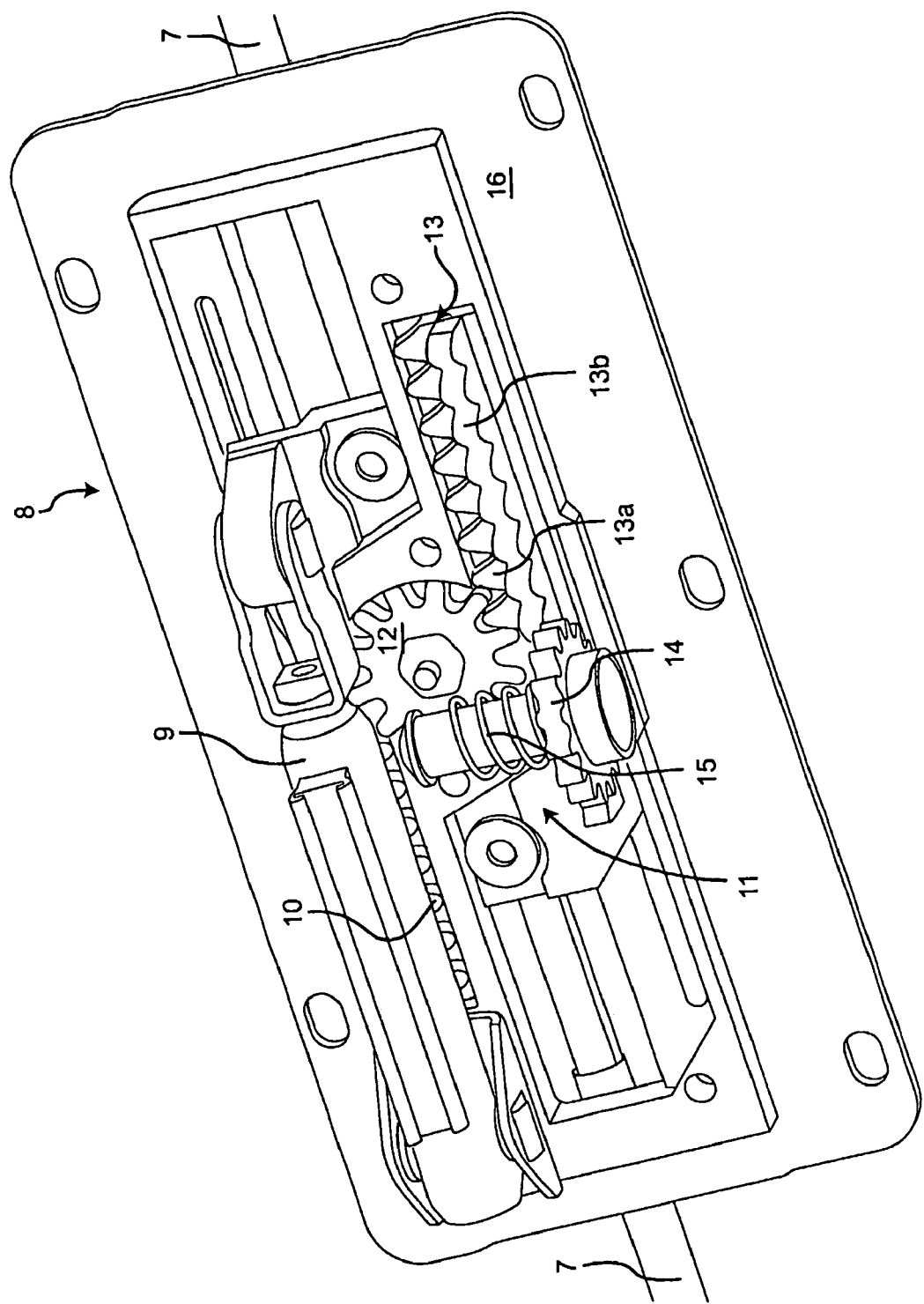
FIG. 4 is the detail IV in FIG. 3 substantially comprising a closure module.
Figure 5:
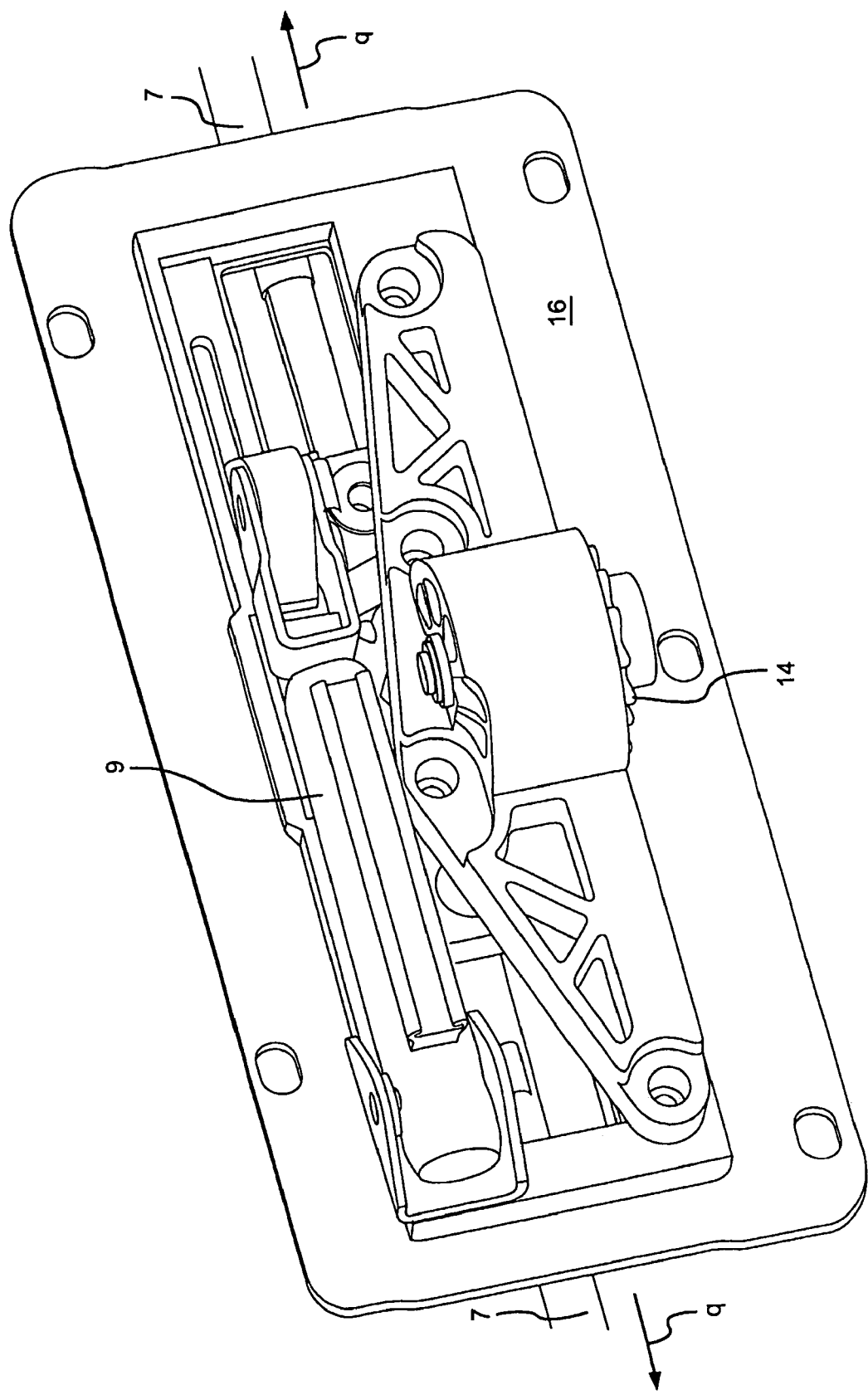
FIG. 5 is a similar view to FIG. 4 with an additional stabilizing frame for the emergency actuation.

A second gear 14 standing perpendicular to the gear 12 is provided here for manual emergency operation and is movable against the force of a spring 15 in engagement with the second coupling arrangement 13b of the transmission element 13 (FIG. 4). Alternatively, the gear 14 can also be constantly in engagement and run along. The spring and the axial displacement arrangement can then be omitted. As can be seen in FIG. 5, the emergency actuation can be surrounded by a stable frame and be secured against external influences.

In FIG. 6, a further embodiment with a hydraulic cylinder 9 is shown which was here, however, swapped in the vertical direction with the transmission 11 and is thus disposed beneath the transmission 11.

A base plate 16 of the closure module can be made such that, selectively, the one or the other type of drive can be installed so that the module 8 can be used both in vehicles with electric closure actuation and with hydraulic closure actuation without further modifications.

The closure module 8 can be pre-assembled and tested in every case before its installation and can be mounted on the shell as a finished, set modular unit.

The invention has been described in an illustrative manner. It is, therefore, to be understood that the terminology used is intended to be in the nature of the words of description rather than of limitation. Many modifications and variations of the invention are possible in light of the above teachings. For example, the invention as described herein is applicable to vehicles having a single row of seats, as well as vehicles having multiple rows of seats. Thus, within the scope of the appended claims, the invention may be practiced other than as specifically described.

We claim:

1. A convertible vehicle comprising:

a roof which can be stowed beneath a cover part in its open position, with at least two movable engagement members for securing of the cover part in a closed position and at least one drive provided which is in operative connection with the engagement members for the transmission of the drive force via force communicators each outwardly engaging with a component in a transverse direction of the vehicle;

characterized in that the at least one drive comprises a drive member disposed generally in the transverse direction (q) of the vehicle and generally in a plane of the force communicators, with a transmission redirecting the direction of movement for a second force communicator being movable via a coupling member movable along a substantially straight line and generally parallel to said drive member and connected to a first force communicator, the first communicator being fixedly connected to the drive member.

2. A convertible vehicle in accordance with claim 1, wherein the drive includes at least one transmission element which is movable along a substantially straight line, and is connected to a force communicator and is provided with a first coupling arrangement for the indirect or direct engagement of the drive and with a second coupling arrangement for the engagement of a manual emergency actuation.

3. A convertible vehicle in accordance with claim 2, wherein at least one of the coupling arrangements is formed by a gear rack portion.

4. A convertible vehicle in accordance with claim 2, wherein the coupling arrangements are perpendicular to one another.

5. A convertible vehicle in accordance with claim 1, wherein a first transmission element is arranged parallel to a piston of a hydraulic drive member which can be pushed out.

6. A convertible vehicle in accordance with claim 5, wherein a gear is rotatable via the first transmission element and a second transmission element, which is movable in a straight line, can be driven by it.

7. A convertible vehicle in accordance with claim 6, wherein the first transmission element and the second transmission element are movable in opposite senses to one another.

8. A convertible vehicle in accordance with claim 1, wherein the force communicators are made as pull-push bars.

* * * * *